US008516127B2

(12) United States Patent
Kang

(10) Patent No.: US 8,516,127 B2
(45) Date of Patent: Aug. 20, 2013

(54) METHOD AND SYSTEM FOR MAINTAINING CONNECTIONS BETWEEN A TERMINAL AND SERVERS IN A COMMUNICATION SYSTEM

(75) Inventor: Chin-Kyu Kang, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 335 days.

(21) Appl. No.: 12/456,456

(22) Filed: Jun. 17, 2009

(65) Prior Publication Data
US 2009/0319670 A1 Dec. 24, 2009

(30) Foreign Application Priority Data

Jun. 18, 2008 (KR) .................. 10-2008-0057339

(51) Int. Cl.
*G06F 15/16* (2006.01)
(52) U.S. Cl.
USPC ........... 709/227; 709/203; 709/224; 370/350; 713/500
(58) Field of Classification Search
USPC ................ 709/203, 223, 224, 227; 370/350; 713/500
See application file for complete search history.

(56) References Cited

U.S. PATENT DOCUMENTS

| 6,212,175 | B1 | 4/2001 | Harsch | |
|---|---|---|---|---|
| 7,477,057 | B2* | 1/2009 | Baumgartl et al. | 324/322 |
| 8,035,480 | B2* | 10/2011 | Woodard et al. | 340/5.73 |
| 2004/0264381 | A1* | 12/2004 | Banerjee et al. | 370/252 |
| 2005/0143146 | A1* | 6/2005 | Kim | 455/574 |
| 2009/0296583 | A1* | 12/2009 | Dolezilek | 370/241 |

FOREIGN PATENT DOCUMENTS

| JP | 04-020057 A | 1/1992 |
|---|---|---|
| JP | 06-037777 A | 2/1994 |
| JP | 06-177902 A | 6/1994 |
| JP | 2004-193865 A | 7/2004 |
| JP | 2007/235197 A | 9/2007 |

OTHER PUBLICATIONS

International Search Report and Written Opinion of International Searching Authority dated Feb. 3, 2010 in connection with International Application No. PCT/KR2009/003247.
"Requirements for Internet Hosts—Communication Layers"; Network Working Group, Internet Engineering Task Force; R. Braden, Editor; Oct. 1989; 109 pages.
"What functions does Keep Alive Have?"; Wireless Master Unit, Cable Router; Apr. 14, 2009; with English Abstract, 2 pages.
Translated Chinese Office Action dated Apr. 9, 2013 in connection with Chinese Patent Application 2009801320733;14 pages.

* cited by examiner

*Primary Examiner* — El Hadji Sall

(57) ABSTRACT

A method and system for maintaining connections between a terminal and a plurality of servers in a stand-by state in which the terminal is connected to the servers. The terminal generates timers for maintaining the connections to the servers. The terminal determines whether a timer expires. When the timer expires, the terminal simultaneously sends packets for connection maintenance notifications to all the servers having communication connections to the terminal.

17 Claims, 6 Drawing Sheets

METHOD AND SYSTEM FOR MAINTAINING CONNECTIONS BETWEEN A TERMINAL AND SERVERS IN A COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Jun. 18, 2008 and assigned Serial No. 10-2008-0057339, the disclosures of which are incorporated herein by reference.

TECHNICAL FIELD OF THE INVENTION

The present invention relates generally to a communication system for performing communication between a terminal and servers, and in particular, to a method and system for maintaining connections between an always-on wireless mobile communication terminal and servers in a stand-by state in which the always-on wireless mobile communication terminal is connected to the servers by Transmission Control Protocol (TCP) connections due to network applications using Internet Protocol (IP) when communication is performed between the always-on wireless mobile communication terminal and the servers.

BACKGROUND OF THE INVENTION

Recently, various technologies for supporting an always-on function, in which IP communication is possible when a terminal is turned on, are being developed. Accordingly, it is expected that most high-end mobile terminals will support the always-on function within several years. When an always-on terminal is turned on, an IP address is allocated and therefore IP communication is possible. Thus, when data is received in a stand-by state after login to a service of a messenger, Voice over IP (VoIP), or IP Multimedia Subsystem (IMS), the messenger service, VoIP video communication, or e-mail reception is possible and also various services of a personal mini web server, and the like, are possible.

In a state in which the always-on terminal has logged in to a plurality of services, a plurality of TCP connections for maintaining communication connections to servers exist in an idle mode. A server for providing various types of services periodically sends a keep-alive packet to a mobile terminal so as to check a TCP connection to a counterpart mobile terminal. Then, the mobile terminal receives the keep-alive packet and sends an Acknowledgement (ACK) packet to the server in response thereto. The server receives the ACK packet from the terminal in response to the sent keep-alive packet, determines whether a communication connection between the server and the terminal is maintained, and continuously maintains the TCP connection.

Thereafter, the server is in the stand-by state until the next keep-alive packet is sent after newly setting a keep-alive timer as a timer for a stand-by time. When the keep-alive timer expires, the server checks the communication connection by re-sending the keep-alive packet to the terminal.

On the other hand, in the stand-by state, the terminal receives the keep-alive packet after changing the terminal state to a traffic state for receiving the keep-alive packet, and transmits an ACK packet to the server in response thereto. A change of the terminal state will be described with reference to the drawings.

FIG. 1 illustrates a current state variation when a conventional mobile terminal receives a keep-alive packet and sends an ACK packet. The mobile terminal receives the keep-alive packet and sends the ACK packet after a change from the stand-by state to the traffic state when the keep-alive packet is received in the stand-by state. After time T1, the mobile terminal returns to the stand-by state. After the server receives the ACK packet, a keep-alive timer corresponding to T2 is set. When the keep-alive timer expires after time T2, a communication connection is checked by re-sending the keep-alive packet to the terminal.

Time T1 is a value determined by a network policy of a provider as a time in which the terminal maintains a traffic state. When no data is transmitted and received during the time, the terminal returns to the stand-by state. For example, time T1 is set to approximately one minute in a Wideband Code Division Multiple Access (WCDMA) network of KTF established as Korea Telecom Freetel. In this case, since the terminal is in the traffic state during one minute for the reception of a keep-alive packet (about twenty bytes) and the transmission of an ACK packet (about twenty bytes), power is consumed.

A problem results from when one mobile terminal has a plurality of TCP connections to a plurality of servers. This will be described with reference to the drawings.

FIG. 2 illustrates an example in which a conventional mobile terminal 205 has TCP connections to a plurality of servers 210, 215, 220. The servers 210, 215, 220 are connected to one mobile terminal 205 over a communication network. Since each server 210, 215, 220 separately maintains a keep-alive timer, keep-alive packets whose number corresponds to the number of TCP connections to the servers 210, 215, 220 are scheduled and received by the mobile terminal 205.

FIG. 3 illustrates a current state variation of a conventional mobile terminal due to a keep-alive packet when the mobile terminal has TCP connections to a plurality of servers. When the mobile terminal is connected to four servers through four TCP connections, the duration of a traffic state for processing a keep-alive packet according to an operation by a keep-alive timer of each server increases even when a user does not use the mobile terminal. As the number of TCP connections increases, the duration of the traffic state is lengthened and therefore power consumption is increased.

SUMMARY OF THE INVENTION

To address the above-discussed deficiencies of the prior art, it is a primary object to provide a method and system for maintaining connections between a terminal and servers that can minimize power consumption according to a state change operation of the terminal for maintaining communication connections between the terminal and the servers.

According to one aspect of the present invention, a method is provided for maintaining connections between a terminal and a plurality of servers in a stand-by state in which the terminal is connected to the servers, including: generating, by the terminal, timers for maintaining the connections to the servers; determining whether a timer expires; and simultaneously sending packets for connection maintenance notifications to all the servers having communication connections to the terminal when the timer expires.

According to another aspect of the present invention, a communication system is provided for maintaining connections between a terminal and a plurality of servers in a stand-by state in which the terminal is connected to the servers, including: the terminal for generating timers for maintaining the connections to the servers and determining whether a timer expires; and at least one server for checking a connection maintenance state by receiving a packet for a connection maintenance notification from the terminal when the timer expires.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

Figure 1:
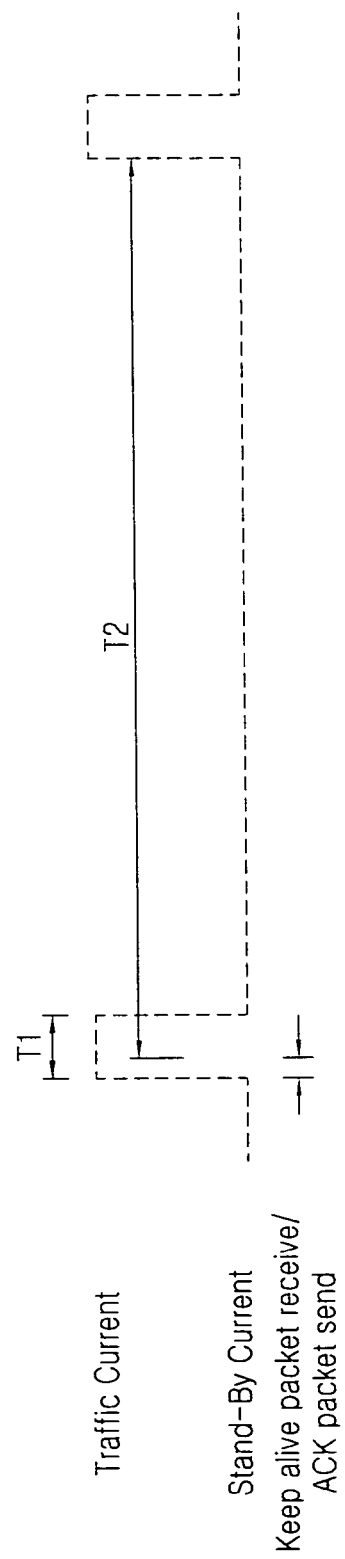
FIG. 1 illustrates a current state variation when a conventional mobile terminal receives a keep-alive packet and sends an ACK packet.
Figure 2:
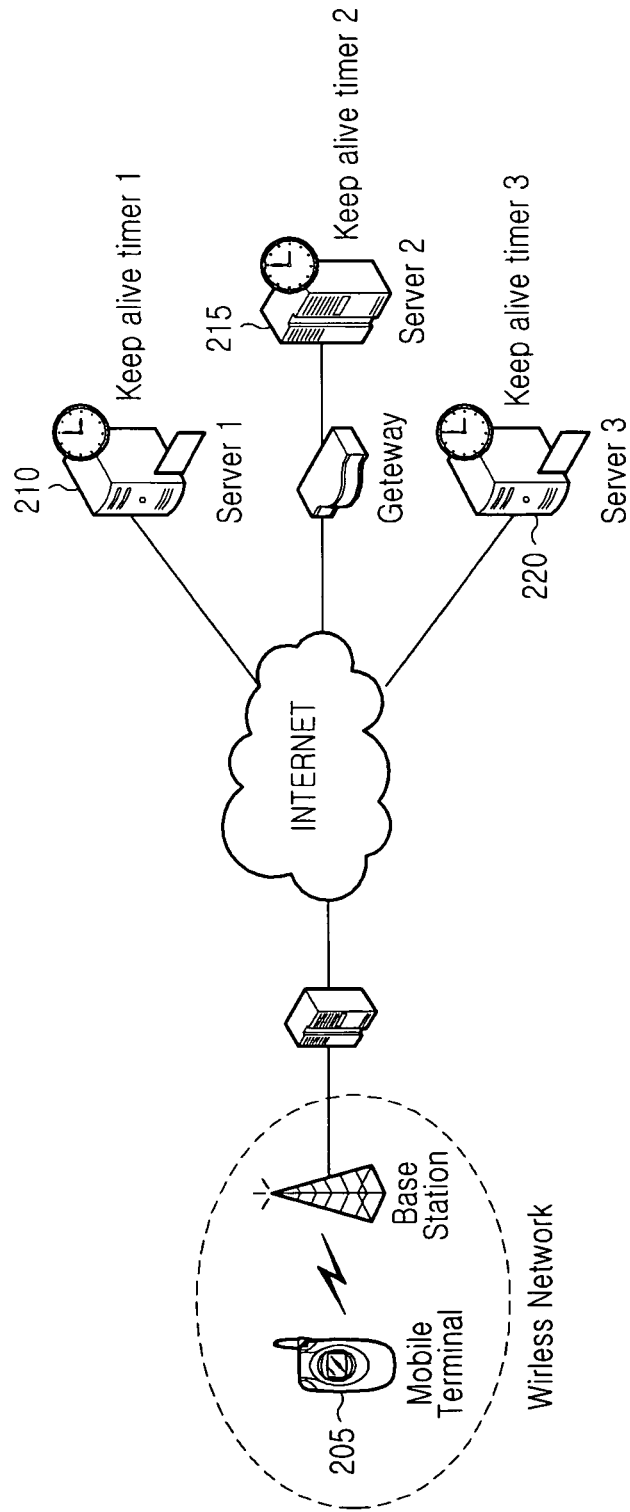
FIG. 2 illustrates an example in which a conventional mobile terminal has TCP connections to a plurality of servers.
Figure 3:
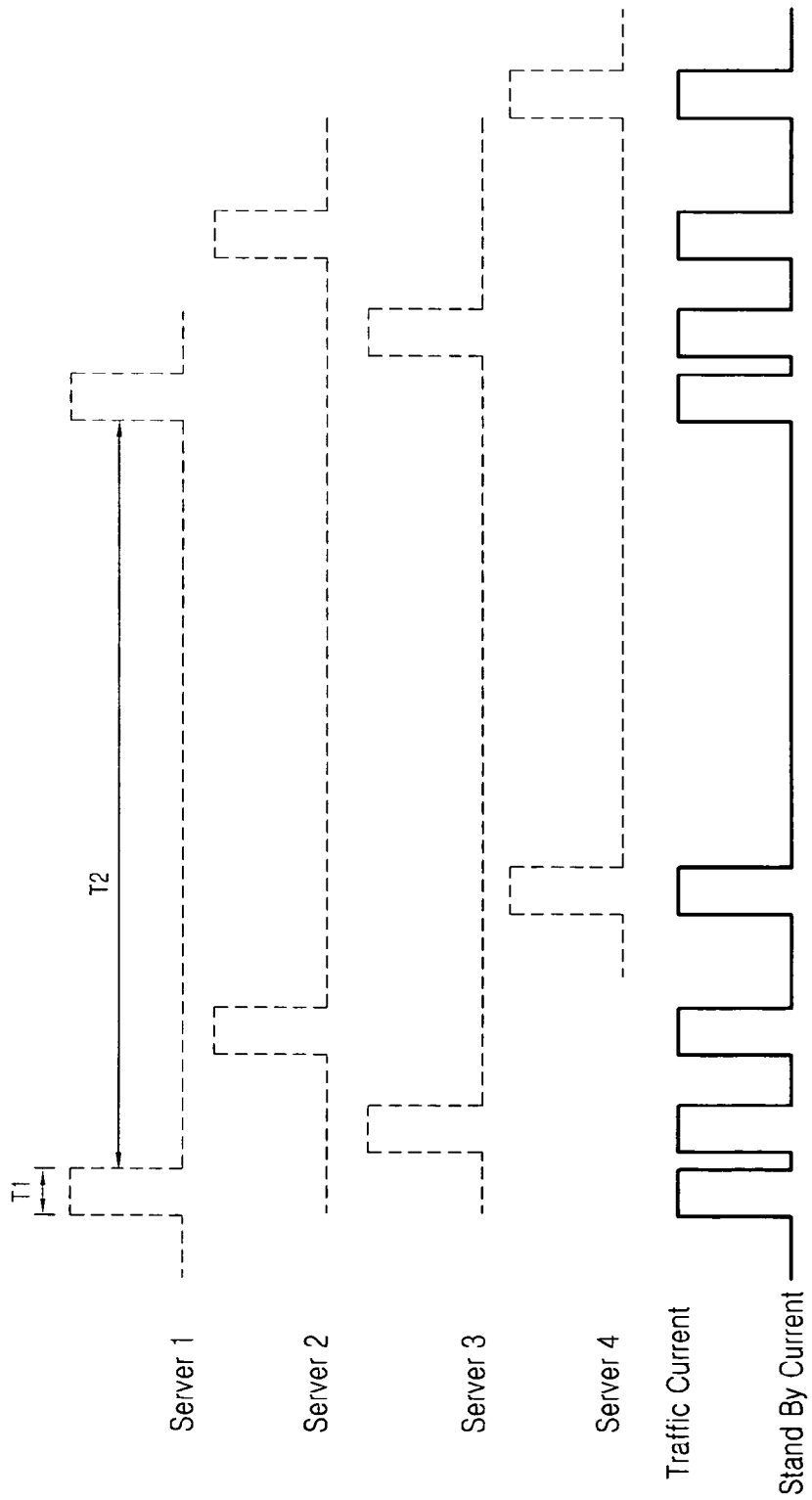
FIG. 3 illustrates a current state variation of a conventional mobile terminal due to a keep-alive packet when the mobile terminal has TCP connections to a plurality of servers.
Figure 4:
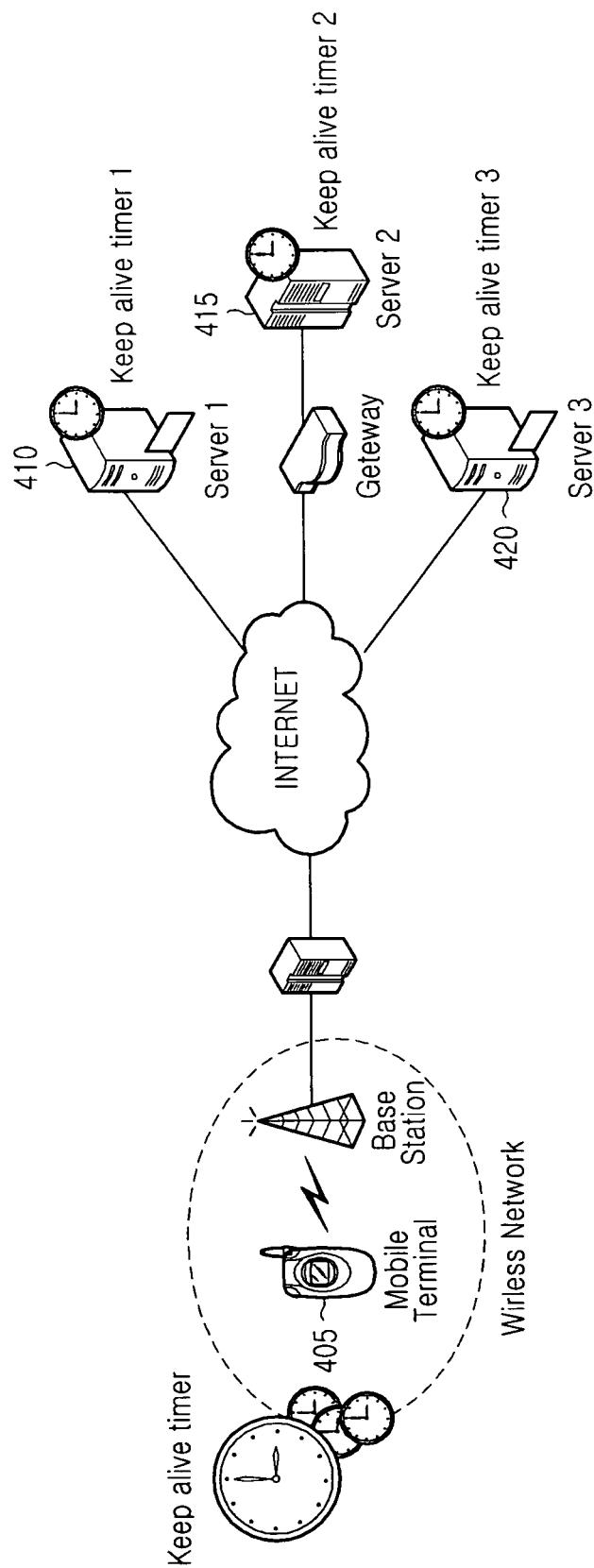
FIG. 4 illustrates an example in which a mobile terminal synchronizes and manages keep-alive timers when the mobile terminal has TCP connections to a plurality of servers in a connection maintenance method according to an exemplary embodiment of the present invention.
Figure 5:
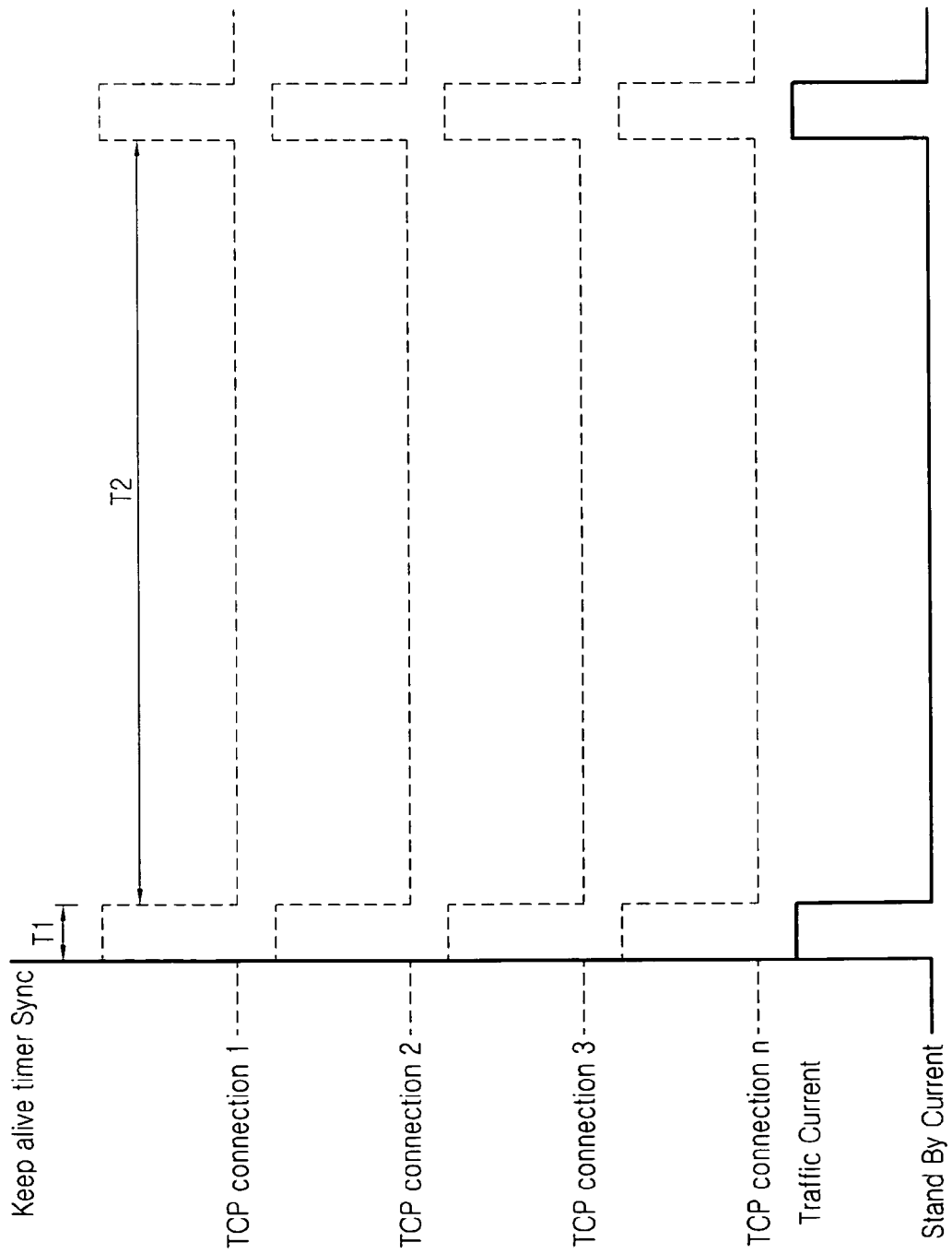
FIG. 5 illustrates a current state variation of the mobile terminal when the mobile terminal synchronizes and manages keep-alive timers in a connection maintenance method according to an exemplary embodiment of the present invention.
Figure 6:
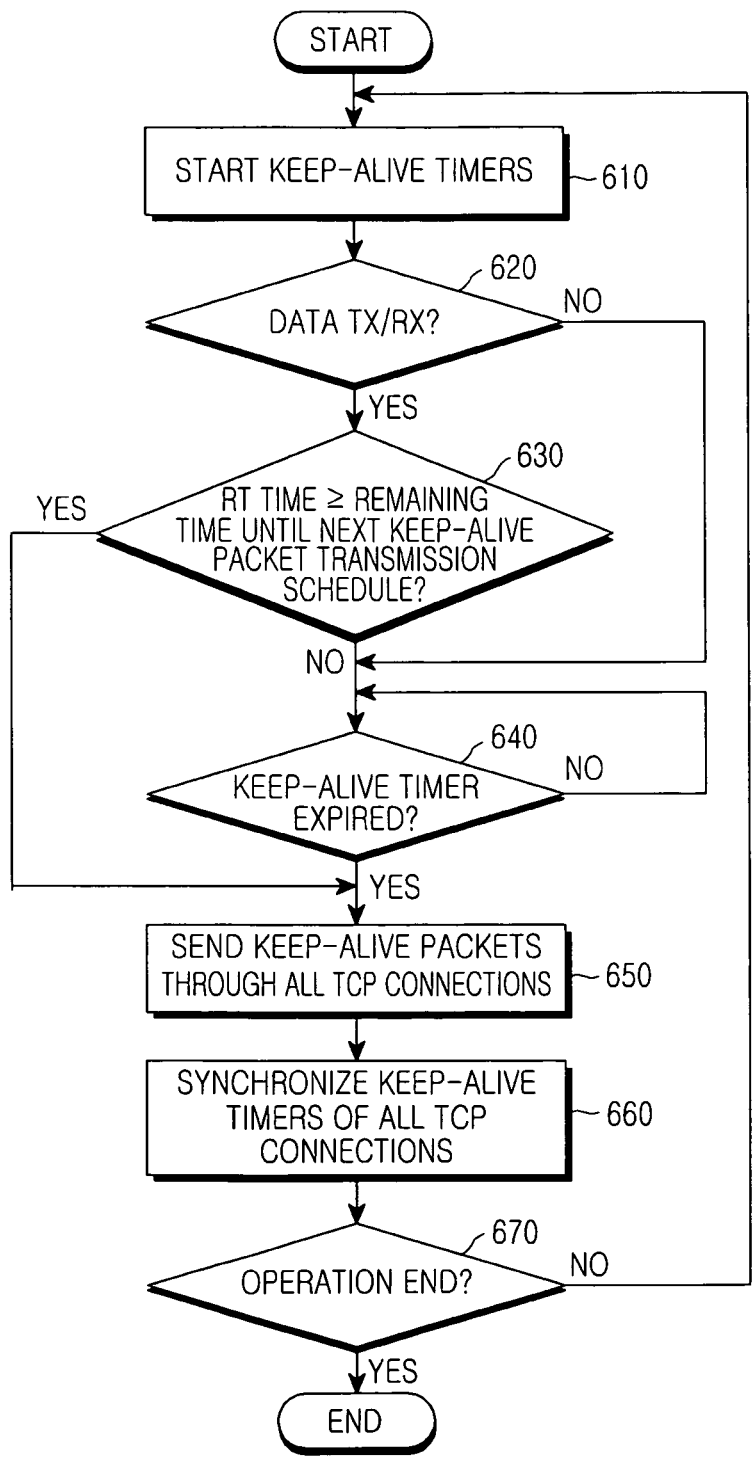
FIG. 6 illustrates a flowchart for a connection maintenance method between an always-on mobile terminal and servers according to an exemplary embodiment of the present invention.

FIGS. 4 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network. Exemplary embodiments of the present invention will now be described in detail with reference to the annexed drawings. The matters defined in the description such as a detailed construction and elements are provided to assist in a comprehensive understanding of exemplary embodiments of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness.

The present invention provides a connection maintenance method between an always-on mobile terminal and servers that can minimize power consumption of the mobile terminal by synchronizing, integrating, and managing keep-alive timers of TCP connections to the servers in a stand-by state in which the mobile terminal is connected to the servers through IP communication in a communication system.

FIG. 4 illustrates an example in which a mobile terminal 405 synchronizes and manages keep-alive timers when the mobile terminal 405 has TCP connections to a plurality of servers 410, 415, 420 in a connection maintenance method according to an exemplary embodiment of the present invention. The keep-alive timers conventionally separately managed by the servers 410, 415, 420 are synchronized and managed in the mobile terminal 405 according to the exemplary embodiment of the present invention. Whenever each keep-alive timer managed by each server 410, 415, 420 expires, a change from a stand-by state to a traffic state is made conventionally. However, the keep-alive timers are integrated and managed as one keep-alive timer according to the exemplary embodiment of the present invention, the change from the stand-by state to the traffic state can be minimized.

To improve a stand-by time and power consumption of the mobile terminal 405 by synchronizing the keep-alive timers in the mobile terminal 405, the mobile terminal enables the keep-alive timer when the TCP connection is established. A keep-alive timer existing in each TCP connection is integrated and managed for the efficiency of stand-by power. An operation of the terminal 405 for enabling the keep-alive timer in the TCP connection is implemented by an existing TCP technology. When there is no need, the terminal 405 does not conventionally enable the keep-alive timer. However, in an exemplary embodiment of the present invention, the keep-alive timer is enabled and used for power efficiency of the terminal.

FIG. 5 illustrates a current state variation of the mobile terminal when the mobile terminal synchronizes and manages keep-alive timers in a connection maintenance method according to an exemplary embodiment of the present invention.

As illustrated in FIG. 5, when the terminal makes n TCP connections to n servers, the terminal is in the stand-by state while generating and operating n keep-alive timers corresponding thereto. When one of the keep-alive timers of the terminal expires in the stand-by state, the terminal can synchronize all the keep-alive timers by sending keep-alive packets to all the servers through all the TCP connections. Since all the keep-alive packets are sent at the same time, the mobile terminal can minimize an operation for changing from the stand-by state to the traffic state for a keep-alive mode.

When data is transmitted/received in the stand-by state, a time until the current keep-alive timer expires is checked.

When the time until the current keep-alive timer expires is equal to or less than a preset RT time (sec), that is, when the keep-alive packets is to be sent to the servers in the near time, the keep-alive packets are pre-sent to the servers through all the TCP connections, so that the mobile terminal can further reduce an additional operation for changing from the stand-by state to the traffic state. In this case, the RT time can be properly set to have a value greater than minimum time T1 and less than maximum time T2/2 through simulations or other tests. In an exemplary embodiment of the present invention, timers whose number corresponds to the number of servers are set, but only one timer corresponding to an arbitrary server can be set so that synchronization can be acquired by sending keep-alive packets of other servers according to the timer of the arbitrary server.

FIG. 6 illustrates a flowchart for a connection maintenance method between an always-on mobile terminal and servers according to an exemplary embodiment of the present invention. In step 610, the terminal generates keep-alive timers whose number corresponds to the number of servers having communication connections thereto and starts the timers. Then, in step 620, the terminal determines whether there is data transmission/reception before a timer expires. When there is no data transmission/reception in step 620, the terminal proceeds to step 640. When there is data transmission/reception in step 620, the terminal proceeds to step 630 to determine whether the remaining time until a scheduled expiration time of the keep-alive timer, that is, the next keep-alive packet transmission schedule, is equal to or less than a preset RT time. When the remaining time until the next keep-alive packet transmission schedule is equal to or less than the preset RT time in step 630, the terminal proceeds to step 650. When the remaining time until the next keep-alive packet transmission schedule is not equal to or less than the preset RT time in step 630, the terminal proceeds to step 640 to determine whether the keep-alive timer expires. When the keep-alive timer does not expire in step 640, the terminal is in the stand-by state. When the keep-alive timer expires in step 640, the terminal proceeds to step 650. Keep-alive packets are sent to all the servers having communication connections through all TCP connections in step 650. Then, the terminal proceeds to step 660 to synchronize all the keep-alive timers and then proceeds to step 670. It is determined whether the operation ends in step 670. When the operation does not end, the terminal proceeds to step 610 to re-start the keep-alive timers and repeat the above-described operation. When the operation ends as the determination result in step 670, the communication connection maintenance operation between the always-on terminal and the servers ends.

In an exemplary embodiment of the present invention, keep-alive timers of all TCP connections to the same terminal are synchronized when the terminal sends keep-alive packets before the keep-alive packets are sent from the servers to the terminal in the above-described method, thereby minimizing an operation in which the terminal is changed from the stand-by state to the traffic state, reducing battery consumption of the terminal, and increasing a stand-by time of the terminal.

According to the above-described exemplary embodiment of the present invention, a connection maintenance method and system can be operated and configured in a communication system.

For example, the connection maintenance method of the present invention can be applied to any device capable of performing communication over a communication network such as a general terminal or personal computer (PC) as well as an always-on terminal.

The present invention can minimize a change to a traffic state due to transmission/reception of a keep-alive packet for checking a communication connection state when an always-on mobile terminal having communication connections to servers is in a stand-by state, thereby reducing battery consumption of the mobile terminal, increasing a stand-by time of the mobile terminal, and increasing the efficiency of radio resources in the viewpoint of a network.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for maintaining connections between a terminal and a plurality of servers in a stand-by state in which the terminal is connected to the servers, comprising:
synchronizing timers associated with respective ones of the connections to the plurality of servers by generating, by the terminal, timers for maintaining the connections to the plurality of servers;
determining whether any one of the generated timer expires;
simultaneously sending packets for connection maintenance notifications to all the servers having communication connections to the terminal when the timer expires, and
determining whether data to be transmitted/received by the terminal exists when the timer does not expire;
determining whether a remaining time until an expiration schedule of the timer is equal to or less than a preset RT time when the data to be transmitted/received exists; and
simultaneously sending the packets for the connection maintenance notifications to all the servers having the communication connections to the terminal when the remaining time until the expiration schedule of the timer is equal to or less than the preset RT time.

2. The method of claim 1, wherein the generating includes:
generating the timers corresponding to the servers having the communication connections to the terminal.

3. The method of claim 1, further comprising:
synchronizing times of the timers by re-starting the timers at the same time.

4. The method of claim 1, wherein the terminal is an always-on terminal.

5. A communication system for maintaining connections between a terminal and a plurality of servers in a stand-by state in which the terminal is connected to the servers, comprising:
the terminal configured to synchronize timers associated with respective ones of the connections to the plurality of servers by generating timers for maintaining the connections to the servers and determine whether any one of the generated timer expires; and
at least one server configured to check a connection maintenance state by receiving a packet for a connection maintenance notification from the terminal when the timer expires,
wherein it is determined whether data to be transmitted/received by the terminal exists when the timer does not expire, it is determined whether a remaining time until an expiration schedule of the timer is equal to or less than a preset RT time when the data to be transmitted/received exists, and the packets for the connection maintenance notifications to all the servers having the communication connections to the terminal are simultaneously sent when the remaining time until the expiration schedule of the timer is equal to or less than the preset RT time.

6. The communication system of claim 5, wherein the terminal is configured to generate the timers corresponding to the servers having the communication connections to the terminal.

7. The communication system of claim 5, wherein the terminal is configured to synchronize times of the timers by re-starting the timers at the same time.

8. The communication system of claim 5, wherein the terminal is an always-on terminal.

9. A mobile terminal for use in a communication system capable of maintaining connections between the mobile terminal and a plurality of servers in a stand-by state in which the mobile terminal is connected to the servers, comprising:
 a timer generator configured to synchronize timers associated with respective ones of the connections to the plurality of servers by generating timers for maintaining the connections to the servers and determining whether a timer expires; and
 a transceiver configured to communicate with at least one server, the server configured to check a connection maintenance state by receiving a packet for a connection maintenance notification from the terminal when the timer expires,
 wherein the packets for the connection maintenance notifications to all the servers having the communication connections to the terminal are simultaneously sent when the remaining time until the expiration schedule of the timer is equal to or less than the preset RT time.

10. The mobile terminal of claim 9, wherein the timer generator is configured to generate the timers corresponding to the servers having the communication connections to the terminal.

11. The mobile terminal of claim 10, wherein the mobile terminal is configured to determine whether any one of the generated timers expires.

12. The mobile terminal of claim 11, wherein the mobile terminal is configured to synchronize times of the timers by re-starting the timers at the same time.

13. The mobile terminal of claim 9, wherein it is determined whether data to be transmitted/received by the mobile terminal exists when the timer does not expire, it is determined whether a remaining time until an expiration schedule of the timer is equal to or less than a preset RT time when the data to be transmitted/received exists.

14. The mobile terminal of claim 9, wherein the mobile terminal is an always-on terminal.

15. The mobile terminal of claim 9, wherein the timer generator configured to generate timers in response to an establishment of a TCP connection between the mobile terminal and at least one of the plurality of servers.

16. The method of claim 1, wherein the generating further comprises:
 integrating a first timer and a second timer, the first timer corresponding to a first TCP connection between the mobile terminal and a first server with the second timer corresponding to a second TCP connection between the mobile terminal and a second server; and
 managing the first timer and second timer as one keep-alive timer.

17. The communication system of claim 5, wherein the terminal is configured to generate timers by:
 integrating a first timer and a second timer, the first timer corresponding to a first TCP connection between the mobile terminal and a first server with the second timer corresponding to a second TCP connection between the mobile terminal and a second server; and
 managing the first timer and second timer as one keep-alive timer.

* * * * *